United States Patent
Kallinke et al.

(10) Patent No.: US 6,561,123 B2
(45) Date of Patent: May 13, 2003

(54) POINTER INSTRUMENT

(75) Inventors: Manfred Kallinke, Hofheim (DE); Joachim Kasalowsky, Bad Homburg (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/899,510

(22) Filed: Jul. 5, 2001

(65) Prior Publication Data

US 2002/0073916 A1 Jun. 20, 2002

(30) Foreign Application Priority Data

Jul. 24, 2000 (DE) .......................... 100 36 037

(51) Int. Cl.[7] .......................... G01D 11/28; B60K 35/00
(52) U.S. Cl. .......................... 116/288; 116/300; 362/30
(58) Field of Search .............................. 362/26, 27, 30; 116/284, 285, 286, 288, 293, 300, 301, 305, 310, 62.1, 62.4; 368/110, 111, 112, 113

(56) References Cited

U.S. PATENT DOCUMENTS

| | | | | |
|---|---|---|---|---|
| 2,534,925 A | * | 12/1950 | Petzinger | 324/132 |
| 2,617,245 A | * | 11/1952 | Johnson | 368/82 |
| 3,152,437 A | * | 10/1964 | Vasselli | 368/37 |
| 3,327,678 A | * | 6/1967 | Jullien-Davin | 116/289 |
| 3,361,968 A | * | 1/1968 | Solow | 324/114 |
| 3,603,282 A | * | 9/1971 | Abromaitis | 116/288 |
| 3,691,987 A | * | 9/1972 | Strock | 116/289 |
| 3,726,081 A | * | 4/1973 | Schneiter | 368/110 |
| 3,776,176 A | * | 12/1973 | Doyle | 116/288 |
| 4,761,715 A | * | 8/1988 | Brooks | 362/23 |
| 5,050,045 A | * | 9/1991 | Kato et al. | 116/288 |
| 5,237,545 A | * | 8/1993 | Schrader et al. | 368/79 |
| 5,797,345 A | * | 8/1998 | Evans et al. | 116/286 |
| 5,878,689 A | * | 3/1999 | Sugita | 116/286 |
| 5,949,346 A | * | 9/1999 | Suzuki et al. | 340/815.45 |
| 6,394,021 B1 | * | 5/2002 | Caron et al. | 116/28.1 |

FOREIGN PATENT DOCUMENTS

| | | |
|---|---|---|
| DE | 2821919 | 11/1978 |
| DE | 3104155 | 12/1981 |
| DE | 3537364 | 4/1987 |
| DE | 4137670 | 5/1992 |
| DE | 19606245 | 8/1997 |
| DE | 19828041 | 1/2000 |
| GB | 818537 | 8/1959 |

* cited by examiner

*Primary Examiner*—Diego Gutierrez
*Assistant Examiner*—R. Alexander Smith
(74) *Attorney, Agent, or Firm*—Martin A. Farber

(57) ABSTRACT

A pointer instrument, in particular in a motor vehicle, has two pointer shafts (3, 8) which can each be driven by a separate pointer drive (13, 9) and are arranged one next to the other, and two scales (1, 2) which are arranged concentrically with respect to one another and are each intended for one pointer (4). One of the pointer shafts (8) is arranged eccentrically, while the other pointer shaft (3) is arranged concentrically with respect to the two concentric scales (1, 2). The pointer which is assigned to the eccentric pointer shaft (8) is embodied as an optical pointer (6) which has a lightguide (7) which is arranged radially on the eccentric pointer shaft (8) and can rotate with the pointer shaft (8), and a lightguide system (10) which is formed from fixed lightguides (11, 11a), the lightguides (11, 11a) of which each start at a small distance from the movement path of the free end of the rotatable lightguide (7) and lead to display segments (5) on the assigned, concentric scale (2).

10 Claims, 1 Drawing Sheet

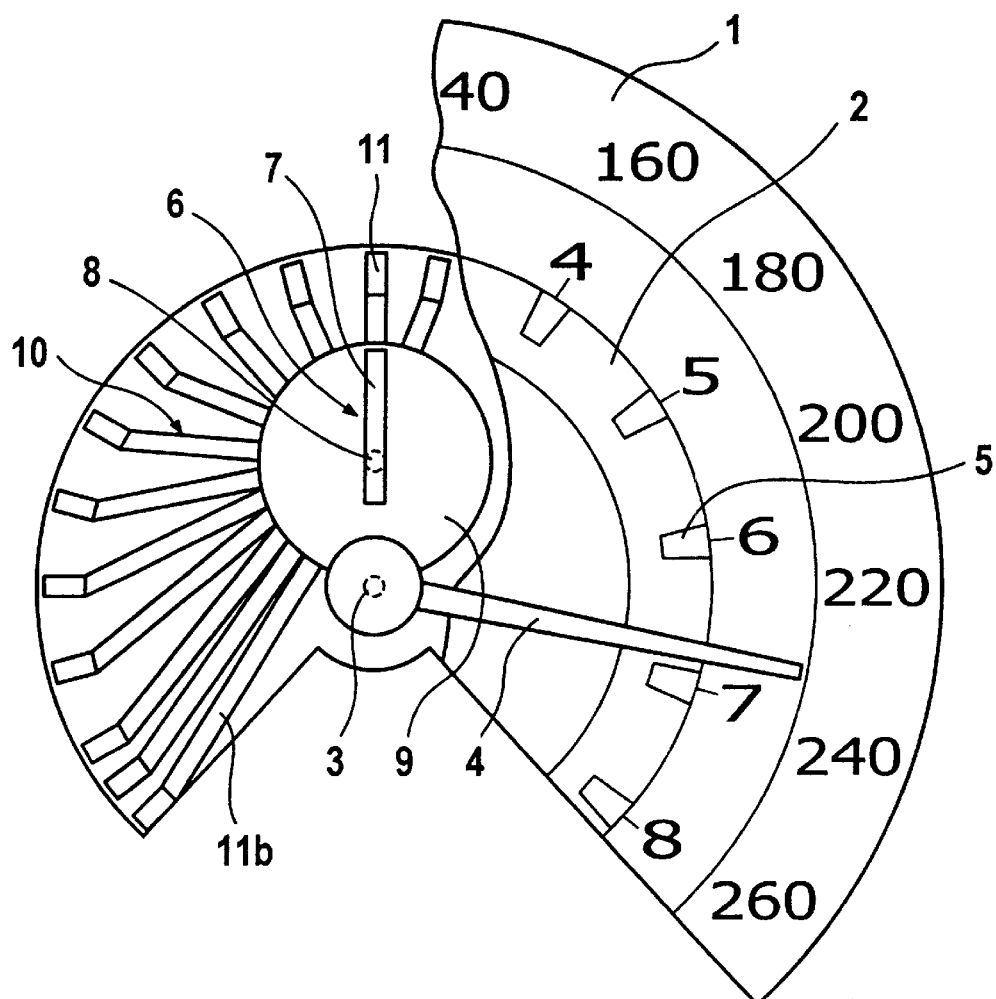
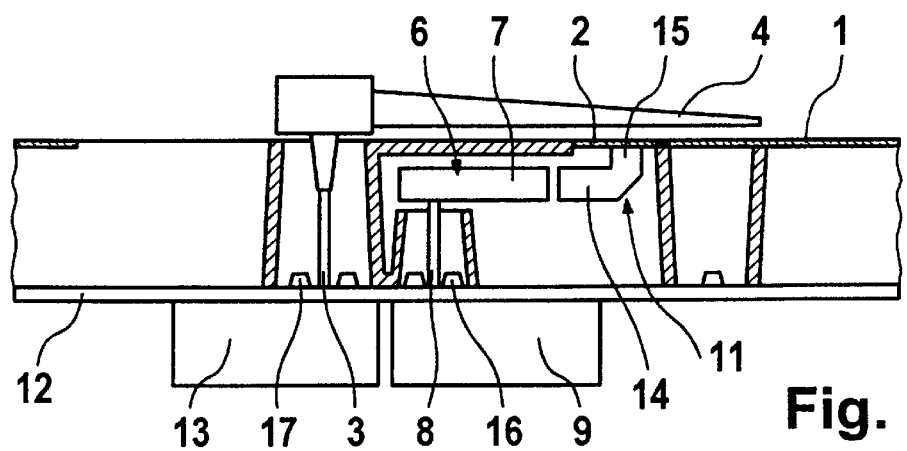

POINTER INSTRUMENT

FIELD AND BACKGROUND OF THE INVENTION

The invention relates to a pointer instrument, in particular in a motor vehicle, having two pointer shafts which can each be driven by a separate pointer drive, and two scales which are arranged concentrically with respect to one another and are each intended for one pointer.

Pointer instruments of the abovementioned type are generally known and customary. Because, in order to make the expenditure acceptable and for reasons of space, the two pointer drives can only be arranged one next to the other, the pointer shafts usually extend at a distance from one another. Accordingly, the ends of the pointers move over eccentric arcs so that the scales also have to be arranged eccentrically with respect to one another. The nonconcentric arrangement of the scales leads, however, to the display instrument often being undesirably being made larger, and gives rise to mutual overlapping of the two scales.

From clocks it is known to embody a pointer shaft as a hollow shaft and to arrange a second pointer shaft in this hollow shaft. This makes it possible to provide one pointer on each of the pointer shafts, the pointers being able to pivot over scales which are arranged concentrically with respect to one another.

With pointer instruments, for motor vehicles, it is already known, in such pointer shafts which are nested one in the other, to drive the pointer shaft which is embodied as a hollow shaft by means of two gear wheels, from a pointer drive which drives laterally with respect to [lacuna] the inner pointer shaft. As a result, the pointer instrument can be provided with two pointers which are aligned concentrically with respect to one another, can pivot over concentric scales and can be driven independently of one another. However, the construction of such a gear wheel mechanism is costly and reduces the dynamics of a display because it requires two gear wheels to be additionally driven by the pointer drive, and relatively high frictional forces occur. Furthermore, it is not possible to illuminate the pointer of the hollow shaft by injecting light into the pointer.

SUMMARY OF THE INVENTION

The invention is based on the problem of constructing a pointer instrument of the type mentioned at the beginning in such a way that with minimum possible expenditure it is possible to obtain two coaxial displays which both have a minimum possible inertia and thus high dynamics, and in which both pointers can be illuminated by injecting light from the side facing away from the viewer.

This problem is overcome according to the invention in that one of the pointer shafts is arranged eccentrically with respect to the two concentric scales, and the pointer assigned to the eccentric pointer shaft is embodied as an optical pointer which has a lightguide which is arranged radially on the eccentric pointer shaft and can rotate with the pointer shaft, and a lightguide system which is formed from fixed lightguides, the lightguides of which each start at a small distance from the movement path of the free end of the movable lightguide and lead to display segments on the assigned, concentric scale.

In such a pointer instrument, two coaxial displays with pointer drives which are arranged eccentrically with respect to one another are possible without two coaxial pointer shafts and a gear mechanism for bridging the distance between the eccentric pointer drive and the pointer shaft assigned to it being required. For this reason, the same display dynamics can be achieved as in a pointer instrument with scales which are arranged eccentrically with respect to one another. Furthermore, the illumination of the two pointers by injecting light does not present any difficulties. Because, in comparison with a pointer instrument with eccentric pointer shafts and eccentric scales, the pointer instrument according to the invention does not require any additional gear mechanism to bridge the distances between the two pointer drives, the pointer instrument according to the invention can be manufactured cost-effectively and does not require any increase in the masses which have to be set in motion in order to carry out a display process.

It is advantageous if the pointer which is assigned to the pointer shaft which is arranged coaxially with respect to the scales is embodied as a mechanical pointer which is mounted on the coaxial pointer shaft. In such a pointer instrument it is possible to provide a customary pointer for the primary display, therefore permitting intermediate values between the individual scale marks also to be read in a customary way. In contrast to this, in the optical display, only light segments which are successive light up so that the display occurs in jumps. As a result, this display is sufficient for variables in which less precise reading of the values is sufficient.

With the optical pointer it is possible to achieve different effects if, according to another development of the invention, the fixed lightguides have different light transmitting capacities from one another. This permits display segments with different degrees of brightness or display segments with the same degree of brightness to be obtained despite different distances from the light source.

If display segments which are at different distances from the light source are to appear with the same brightness, it is possible to provide for the light transmitting capacity of the fixed lightguides to be selected such that it is higher as the length of the lightguides increases.

The light transmitting capacity can be influenced by different materials for the fixed lightguides. The light transmitting capacity can be varied particularly easily if the light transmitting capacity is determined by different cross sections of the fixed lightguides.

The pointer instrument is of particularly simple design if the fixed lightguides each have a region which extends approximately parallel to the front side of the pointer instrument, and lead, with a bent portion on their radially outer side, to one display segment each of the inner scale.

Depending on the respective measurement variable, in the pointer instrument according to the invention different scale markings are illuminated when the display segments are embodied as scale markings.

Here, it is also possible to provide for the display segments to be colored differently. As a result, it is possible to illuminate critical states, for example the point where a residual quantity is reached in a fluid gauge display, by means of an appropriate color selection.

Another development of the invention comprises embodying at least one display segment as a warning display field. In such a case, the rotatable lightguide could be pivoted, by appropriately actuating the pointer drive display, in such a way that it illuminate a desired display field via the corresponding, fixed lightguide, and as a result, for example, an optical warning for excessively low oil pressure or for excessively high water temperature of the engine appears.

For application in a motor vehicle it is particularly advantageous if the mechanical pointer is part of a tachometer of a motor vehicle, and the optical pointer is part of a revolution counter of a motor vehicle.

BRIEF DESCRIPTION OF THE DRAWINGS

The invention permits various embodiments. One of these is represented schematically in the drawing and will be described below. In said drawing:

FIG. 1 shows a partially broken, plan view of a display instrument according to the invention, FIG. 2 shows a longitudinal section through the display instrument, illustrated rotated through 90° with respect to FIG. 1.

DETAILED DESCRIPTION OF THE PREFERRED EMBODIMENT

As is apparent from FIG. 1, a display instrument, which is provided for installation in a motor vehicle (not illustrated in more detail) has here an outer scale 1, which is a tachometer scale, and an inner scale 2, embodied as a revolution counter scale, which are coaxial to one another. The outer scale 1 is represented only in the right-hand part of FIG. 1 so that in the left-hand part of the figure components present below it can be seen. Arranged coaxially with respect to both scales 1, 2 is a pointer shaft 3 which is fitted with a mechanical pointer 4 and extends as far as the outer scale 1 so as to display the respective speed of a vehicle there in a customary way.

On the inner scale 2, display segments 5 are provided which can be illuminated individually so that at a specific rotational speed of the engine a specific display segment 5 respectively lights up. An optical pointer 6 is used to illuminate the respective display segment 5. Said pointer 6 has a rotatable lightguide 7 which is arranged on a pointer shaft 8, arranged eccentrically with respect to the pointer shaft 3, of a pointer drive 9. A lightguide system 10, which is formed from individual, fixed lightguides 11, is also associated with the optical pointer 6. These lightguides 11 each have different lengths. It is apparent that, for example, one lightguide 11b has a length which is a multiple of the lightguide 11. All the lightguides 11, 11b each start at a small distance from the movement path of the free end of the movable lightguide 7 and lead to the display segments 5, shown in the right-hand part of the figure, on the inner scale 2.

FIG. 2 shows, under a printed circuit board 12, a pointer drive 13 which is capable of driving the coaxial pointer shaft 3 with the mechanical pointer 4. To the side of the pointer drive 13 the pointer drive 9 is shown with the pointer shaft 8 and the rotatable lightguide 7. The pointer drives 9, 13 are usually stepping motors. One of the fixed lightguides 11 is also shown. It has a region 14 which extends approximately parallel to the front side of the pointer instrument, and, on its radially outer side, a bent portion 15 which leads to the inner scale 2. In order to illuminate the display segments 5 (shown in FIG. 1) of the inner scale 2, LEDs 16 are used, via which light is initially injected into the rotatable lightguide 7 and subsequently passes into the respective fixed lightguide 11 which is aligned flush with the outer end of the rotatable lightguide 7.

The mechanical pointer 4 is illuminated by LEDs 17 which are capable or injecting light into it.

Instead of being markings on the scale 2, the display segments 5 may also be display fields which can be illuminated when necessary by the rotatable lightguide 7 and one of the fixed lightguides 11.

We claim:

1. A pointer instrument, comprising two pointer shafts which are each driveable by a separate pointer drive and each having a pointer, and two scales which are arranged concentrically with respect to one another and are each coordinated to one of said pointers, wherein one of the pointer shafts (8) is arranged eccentrically with respect to the two concentric scales (1, 2), and the pointer coordinated to the eccentric pointer shaft (8) is an optical pointer (6) which has a lightguide (7), which is arranged radially on the eccentric pointer shaft (8) and rotatable with the pointer shaft (8), the optical pointer (6) also having a lightguide system (10) which is formed from fixed lightguides (11, 11b), the fixed lightguides (11, 11b) of which each start at a small distance from a movement path of a free end of the rotatable lightguide (7) and lead to display segments (5) on the concentric scale (2), which is coordinated to said optical pointer (6).

2. The pointer instrument as claimed in claim 1, wherein the pointer (4) which is coordinated to the pointer shaft (3) which is arranged coaxially with respect to the scales (1, 2) is a mechanical pointer (4) which is mounted on the coaxial pointer shaft (3).

3. The pointer instrument as claimed in claim 2, wherein the mechanical pointer (4) is part of a tachometer of a motor vehicle, and the optical pointer (6) is part of a revolution counter of a motor vehicle.

4. The pointer instrument as claimed in claim 1, wherein the fixed lightguides (11, 11b) have different light transmitting capacities from one another.

5. The pointer instrument as claimed in claim 4, wherein the light transmitting capacity of the fixed lightguides (11, 11b) is selected such that it is higher as length of the lightguides (11, 11b) increases.

6. The pointer instrument as claimed in claim 4, wherein the light transmitting capacity is determined by different cross sections of the fixed lightguides (11, 11b).

7. The pointer instrument as claimed in claim 1, wherein the fixed lightguides (11, 11b) each have a region (14) which extends approximately parallel to a front side of the pointer instrument, and lead, with a bent portion (15) on their radially outer side, to one of the display segments (5) of the concentric scale (2) which is coordinated to said optical pointer (6).

8. The pointer instrument as claimed in claim 7, wherein the display segments (5) are scale markings.

9. The pointer instrument as claimed in claim 7, wherein the display segments (5) are colored differently.

10. The pointer instrument as claimed in claim 7, wherein at least one display segment (5) is formed as a warning display field.

* * * * *